(12) United States Patent
Hinck (10) Patent No.: US 9,444,509 B2
(45) Date of Patent: Sep. 13, 2016

(54) NON-BLOCKING POWER MANAGEMENT FOR ON-PACKAGE INPUT/OUTPUT ARCHITECTURES

(71) Applicant: Intel Corporation, Santa Clara, CA (US)

(72) Inventor: Todd A. Hinck, Arlington, MA (US)

(73) Assignee: Intel Corporation, Santa Clara, CA (US)

( * ) Notice: Subject to any disclaimer, the term of this patent is extended or adjusted under 35 U.S.C. 154(b) by 919 days.

(21) Appl. No.: 13/629,357

(22) Filed: Sep. 27, 2012

(65) Prior Publication Data

US 2014/0085791 A1    Mar. 27, 2014

(51) Int. Cl.
| G06F 1/00 | (2006.01) |
| H04B 1/40 | (2015.01) |
| G06F 1/16 | (2006.01) |
| G06F 1/10 | (2006.01) |
| G06F 1/32 | (2006.01) |

(52) U.S. Cl.
CPC ........ *H04B 1/40* (2013.01); *G06F 1/10* (2013.01); *G06F 1/1637* (2013.01); *G06F 1/3203* (2013.01)

(58) Field of Classification Search
CPC ......... H04B 1/40; G06F 1/10; G06F 1/1637; G06F 1/3203
USPC ....................................................... 713/300
See application file for complete search history.

(56) References Cited

U.S. PATENT DOCUMENTS

| 7,205,787 | B1 | 4/2007 | Massoumi et al. | |
| 8,390,249 | B2 | 3/2013 | Walley et al. | |
| 2004/0203483 | A1 | 10/2004 | Carballo et al. | |
| 2008/0123721 | A1* | 5/2008 | Giorgetta | H03M 9/00 375/219 |
| 2008/0292007 | A1* | 11/2008 | Lida et al. | 375/257 |
| 2009/0206791 | A1 | 8/2009 | Jung | |
| 2011/0127952 | A1 | 6/2011 | Walley et al. | |
| 2012/0079300 | A1 | 3/2012 | Hachisuga et al. | |
| 2012/0200397 | A1 | 8/2012 | Nakajima et al. | |
| 2013/0313709 | A1* | 11/2013 | Hinck et al. | 257/738 |

FOREIGN PATENT DOCUMENTS

CN    102082449 (A)    6/2011

OTHER PUBLICATIONS

International Preliminary Report on Patentability for International Application No. PCT/US2013/045237 mailed Mar. 31, 2015, 6 pages.
International Search Report and Written Opinion for International Application No. PCT/US2013/045237 Mailed Nov. 19, 2013, 11 pages.

* cited by examiner

*Primary Examiner* — Robert Cassity
(74) *Attorney, Agent, or Firm* — Blakely, Sokoloff, Taylor & Zafman LLP (57) ABSTRACT

An on-package interface. A first set of single-ended transmitter circuits on a first die. The transmitter circuits are impedance matched and have no equalization. A first set of single-ended receiver circuits on a second die. The receiver circuits have no termination and no equalization. A plurality of conductive lines couple the first set of transmitter circuits and the first set of receiver circuits. The lengths of the plurality of conductive lines are matched.

20 Claims, 7 Drawing Sheets

NON-BLOCKING POWER MANAGEMENT FOR ON-PACKAGE INPUT/OUTPUT ARCHITECTURES

TECHNICAL FIELD

Embodiments of the invention relate to power management and input/output architectures and interfaces. More particularly, embodiments of the invention relate to non-blocking power management techniques for use with high-bandwidth on-package input/output architectures and interfaces.

BACKGROUND

High bandwidth interconnections between chips using conventional input/output (I/O) interfaces require significant power and chip area. Thus, in applications requiring significantly reduced power consumption and/or smaller chip area, these conventional interfaces are not desirable.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein is an On-Package I/O (OPIO) interface that solves the problems of conventional I/O interfaces by providing very high bandwidth I/O between chips in a Multi Chip Package (MCP) with very low power, area and latency. OPIO may be useful, for example, to interconnect a processor to memory (eDRAM/DRAM), another processor, a chip set, a graphics processor, or any other chip in a MCP with an order of magnitude lower energy per bit and area per bandwidth compared to conventional I/O.

Effective power management of OPIO memory links is important to maximize the ratio of power spent on I/O versus power allocated to the processing core/logic. In general, more read bandwidth is necessary than write bandwidth. However, a memory interconnect like DDRx (e.g., DDR-2, DDR-3, DDR-4), has traditionally used a bidirectional bus where a memory controller determined how much bandwidth to allocate to either reads or writes based on workload.

With use of an OPIO architecture, the memory interconnect from a processor to in-package memory is designed to be uni-directional with distinct read and write channels where each read/write channel is of equal width and are running at equal data rates. For certain applications, a full-width write channel is necessary, but in general the write channel bandwidth utilization is lower than the read channel utilization.

While OPIO has been designed to have a much more linear power relation between activity and I/O power consumption, it still burns some static power. One approach is to put a link into an idle power management state, but this power management state puts the entire link to sleep and has an associated exit latency.

Various embodiments of the interfaces described herein include one or more of the following components: (1) a single-ended, high-speed I/O interface (e.g., CMOS interface) between IC chips in a MCP with a relatively small die-to-die gap; (2) an impedance matched transmitter (e.g., CMOS transmitter) with no receiver termination or very weak termination, and no equalization; (3) a forwarded clock signal for a cluster of signals with length-matched routing to minimize or eliminate per pin de-skew; and/or (4) reduced electrostatic discharge (ESD) protection (e.g., 70 V) to provide lower pad capacitances and higher data rates.

Close chip assembly in MCP enables very short length matched I/O traces, which in turn enables OPIO architectures described herein to run at high bandwidth using simplified single-ended I/O and clocking circuits to reduce power, area and latency. In one embodiment, high-speed, single-ended I/O with minimum bump pitch reduces bump limited silicon area for required bandwidth.

In one embodiment, use of a CMOS transmitter and receiver with no or weak receiver termination and no equalization can reduce I/O power. Simplified clocking with forwarded clock per cluster of signals and no per pin de-skew can be achieved due to careful length matched routing reduces clock power. Thus, the OPIO architectures described herein provide high bandwidth between chips at very low power, area and latency. MCP with OPIO provides product, process and die area flexibility without significant power and area overhead. The OPIO architectures described herein can also be extended to close discrete packages with full ESD protection for small form factor mobile applications at lower data rates. Multi-level (e.g., M-PAM) signaling can be used at higher data rates to keep the clock frequency down.

Figure 1:
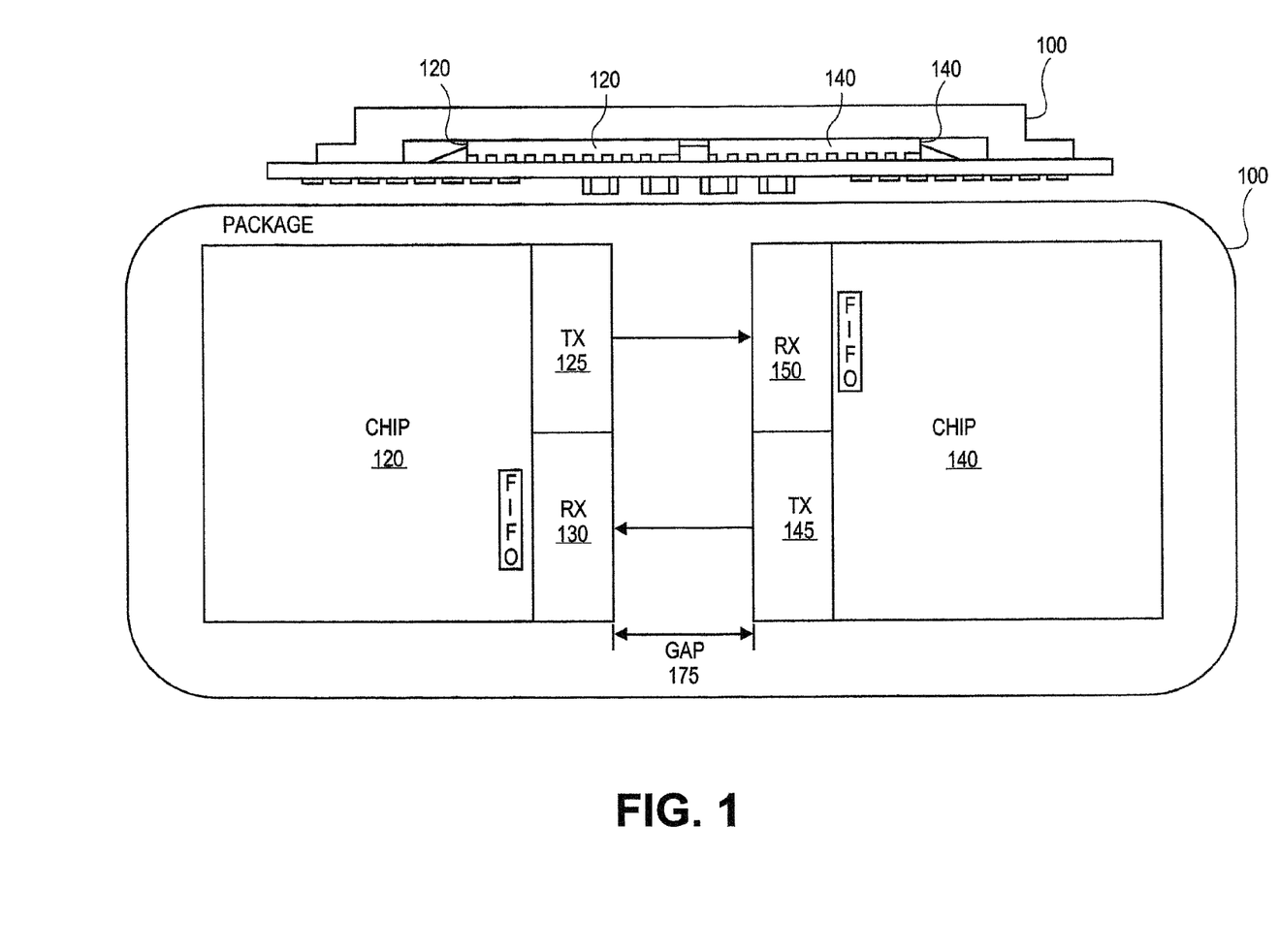
FIG. 1 is a block diagram of one embodiment of a multichip package (MCP) having on-package input/output (OPIO) interfaces between at least two chips.

FIG. 1 is a block diagram of one embodiment of a multichip package (MCP) having on-package input/output (OPIO) interfaces between at least two chips. The example of FIG. 1 illustrates two chips with interfaces; however, any number of chips within a package can be interconnected using the techniques described herein.

Package 100 may be any type of package that may contain multiple integrated circuit chips. In the example of FIG. 1, package 100 contains chip 120 and chip 140. These chips may be, for example, processors, memory chips, graphics processors, etc.

In one embodiment, chip 120 includes OPIO transmitters 125 and OPIO receivers 130. Similarly, chip 140 includes OPIO transmitters 145 and OPIO receivers 150. Transmitters 125 are coupled with receivers 150 and transmitters 145 are coupled with receivers 130.

In one embodiment, gap 175 between chip 120 and chip 140 is relatively small. In one embodiment, gap 175 is less than 20 mm. In one embodiment, gap 175 is less than 10 mm. In one embodiment, gap 175 is approximately 1.5 mm. In other embodiments, gap 175 may be less than 1.5 mm. In general, the smaller gap 175, the greater the bandwidth that may be provided between chips.

In one embodiment, the interfaces between transmitter 125 and receiver 150, and between transmitter 145 and receiver 130 are single-ended, relatively high-speed interfaces. In one embodiment, the interfaces are CMOS interfaces between chip 120 and chip 140. In one embodiment, transmitters 125 and 145 are impedance matched CMOS transmitters and no termination or equalization is provided. In one embodiment, transmitters 125 and 145 are impedance matched CMOS transmitters and very weak termination and no equalization is provided.

In one embodiment, a forwarded clock signal is transmitted for a cluster of signals. In one embodiment, length-matched routing is provided between the transmitters and the receivers. In one embodiment, minimal electrostatic discharge (ESD) protection (as little as 70 Volts) is provided for the interfaces between chips 120 and 140.

In one embodiment, use of a CMOS transmitter and receiver with no or weak receiver termination and no equalization can reduce I/O power. Simplified clocking with forwarded clock per cluster of signals and no per pin de-skew can be achieved due to careful length matched routing reduces clock power. Thus, the architectures described herein provide high bandwidth between chips at very low power, area and latency.

The architectures described herein can also be extended to close discrete packages with full ESD protection for small form factor mobile applications at lower data rates. Multi-level (e.g., M-PAM) signaling can be used at higher data rates to keep the clock frequency down.

Figure 2:
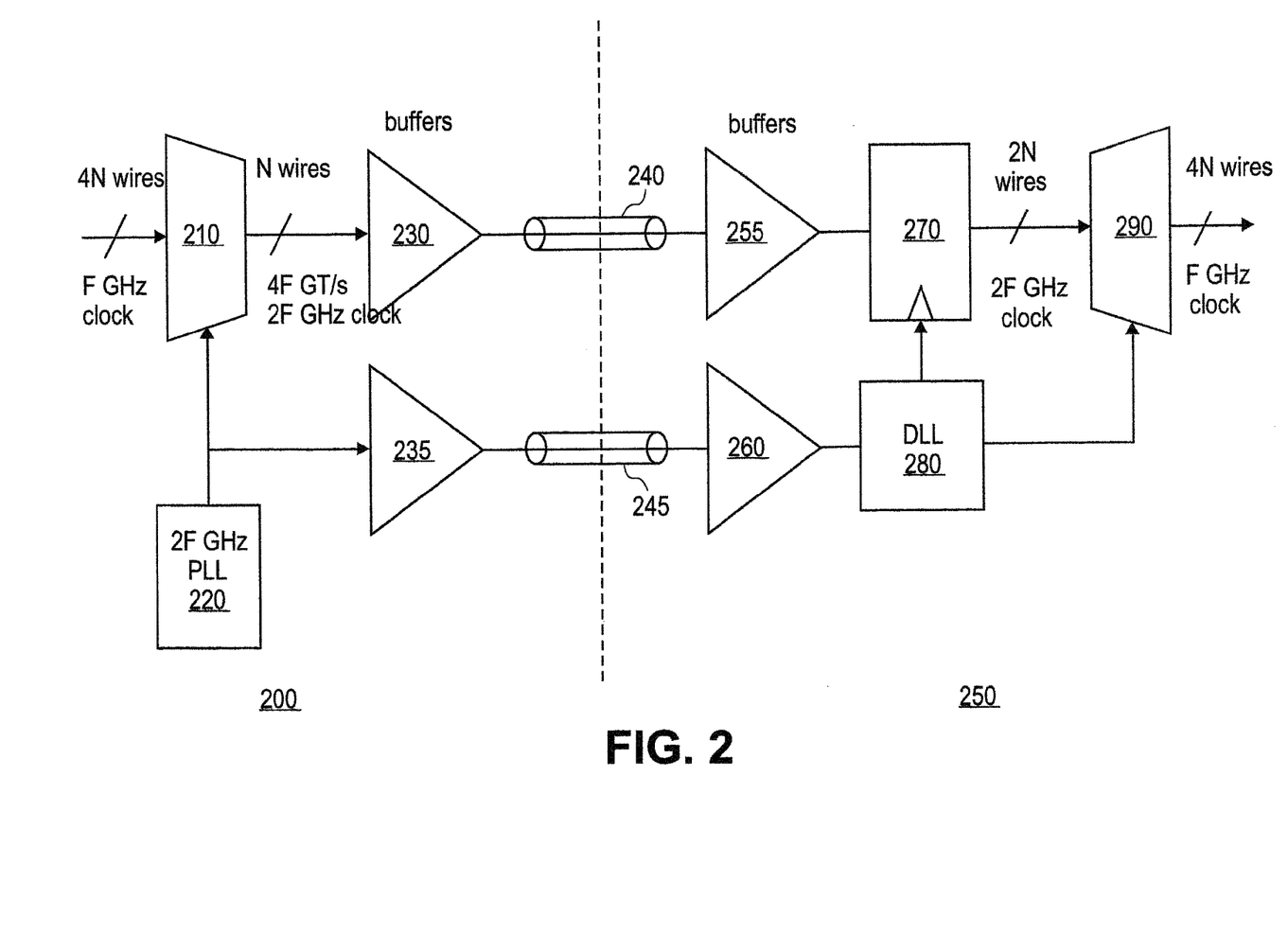
FIG. 2 is a diagram of one embodiment of a physical layer interface.

FIG. 2 is a diagram of one embodiment of a physical layer interface. The physical layer interface of FIG. 2 may provide the interfaces described above with respect to FIG. 1. Chip 200 and chip 250 reside in a single package and are physically positioned with a relatively small gap between them, as described above.

The example of FIG. 2 provides transmission from chip 200 to chip 250. A similar physical layer interface may be used to transmit from chip 250 to chip 200. The example of FIG. 2 provides a 4:1 multiplexing mechanism, which is optional and be eliminated for certain embodiments or other multiplexing ratios may be supported based on, for example, transmission speeds compared to internal clock signals, etc.

In one embodiment, multiplexor 210 receives as input signals from 4N lines and a clock signal at F GHz. In one embodiment, multiplexor 210 is driven by a clock signal from 2F GHz phase locked loop (PLL) 220.

In one embodiment, the signal from 2F GHz PLL 220 is also provide to buffer 235 to be transmitted to chip 250 over transmission line 245. In one embodiment, only one such forwarded clock signal is sent per cluster of N data signals, where N can be one or more bytes (N=8, 16, 32 data bits for example). Multiplexor 210 multiplexes the 4N signals to N lines to be provided to buffer(s) 230 for transmission to chip 250 over transmission line(s) 240.

Buffer 260 on chip 250 receives the 2F GHz clock signal from transmission line 245. Similarly, buffer(s) 255 receive the signals from N lines over transmission line(s) 240. In one embodiment, the 2F GHz signal from buffer 260 drives digital locked loop (DLL) 280, which in turn drives sampler 270.

Sampler 270 latches the signals from N lines received from buffer 255 to 2N lines with a 2F GHz clock signal using both edges of the clock, which are sent to demultiplexor 290, also driven by DLL 280. Demultiplexor 290 recovers the signals from the 4N lines and the F GHz clock signal originally received by multiplexor 210 on chip 200. Thus, the signals from the 4N lines may be transmitted from chip 200 to chip 250 over transmission lines 240 and 245.

Figure 3:
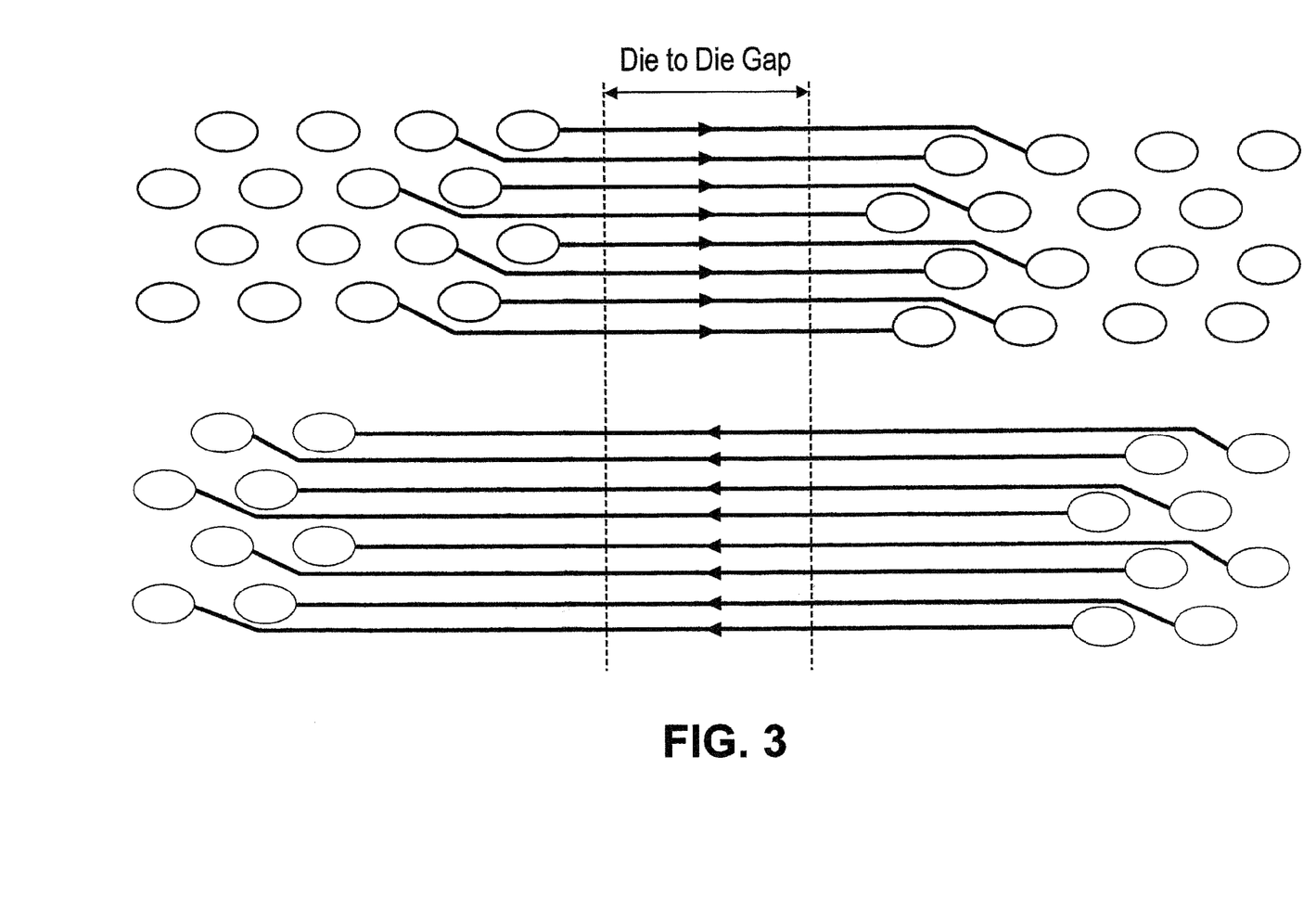
FIG. 3 is a diagram of one embodiment of length-matched routing to avoid per-pin de-skew.

FIG. 3 is a diagram of one embodiment of length-matched routing to avoid per-pin de-skew. Close chip assembly in a MCP may enable very short, length-matched interface lines, which support higher bandwidth transmissions using single-ended I/O and clocking circuits. High-speed, single-ended I/O interfaces with minimal bump pitch reduces bump-limited silicon area, thus providing a more area efficient interface.

Techniques described herein provide a dynamic, non-blocking power management state where the write (or read) channel data width is modulated based on workload to save I/O power. In one embodiment, full-width to half-width modulation of the write channel is used; however, in other embodiments, different write channel widths (e.g., quarter, third) and/or read channel width modulation can be utilized. By utilizing channel width modulation, a non-blocking lower power operational state can be provided.

As an example, in a system in which write channel utilization is in the range of 20-40% of available bandwidth, the write channel can be reduced from 72 bits transmitted over 8 I/O periods to 36 bits transmitted over 16 I/O periods. The effective write bandwidth is reduced by half and the write bandwidth utilization is increased while reducing static power consumption.

Figure 4:
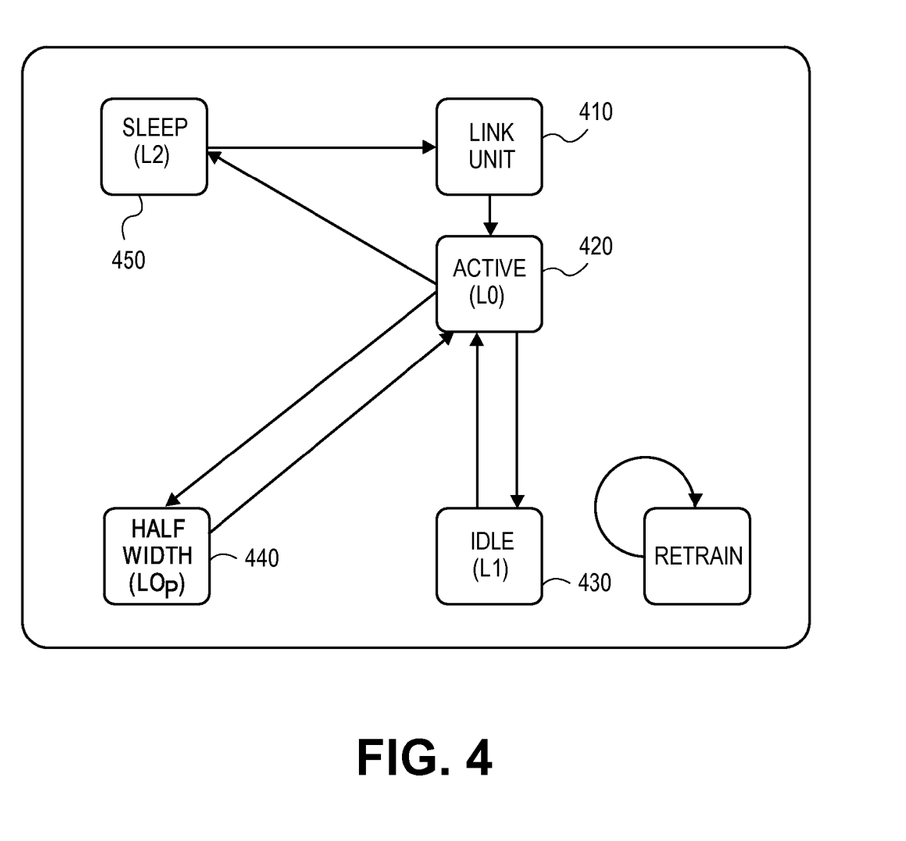
FIG. 4 is a state diagram of one embodiment of a technique for a non-blocking low power state for an on-package input/output interface.

FIG. 4 is a state diagram of one embodiment of a technique for a non-blocking low power state for an on-package input/output interface. The states in FIG. 4 may be utilized with read and/or write channels.

The communications link (whether the read channel or the write channel) is initiated in link initialization state 410. Initialization can be performed in any appropriate manner. In one embodiment, the I/O link is initialized, the clocking system powered up, and the I/O lanes are trained. For bus systems that do not require training or which have the clock embedded, some or all of these link activities might not be necessary.

Figure 5:
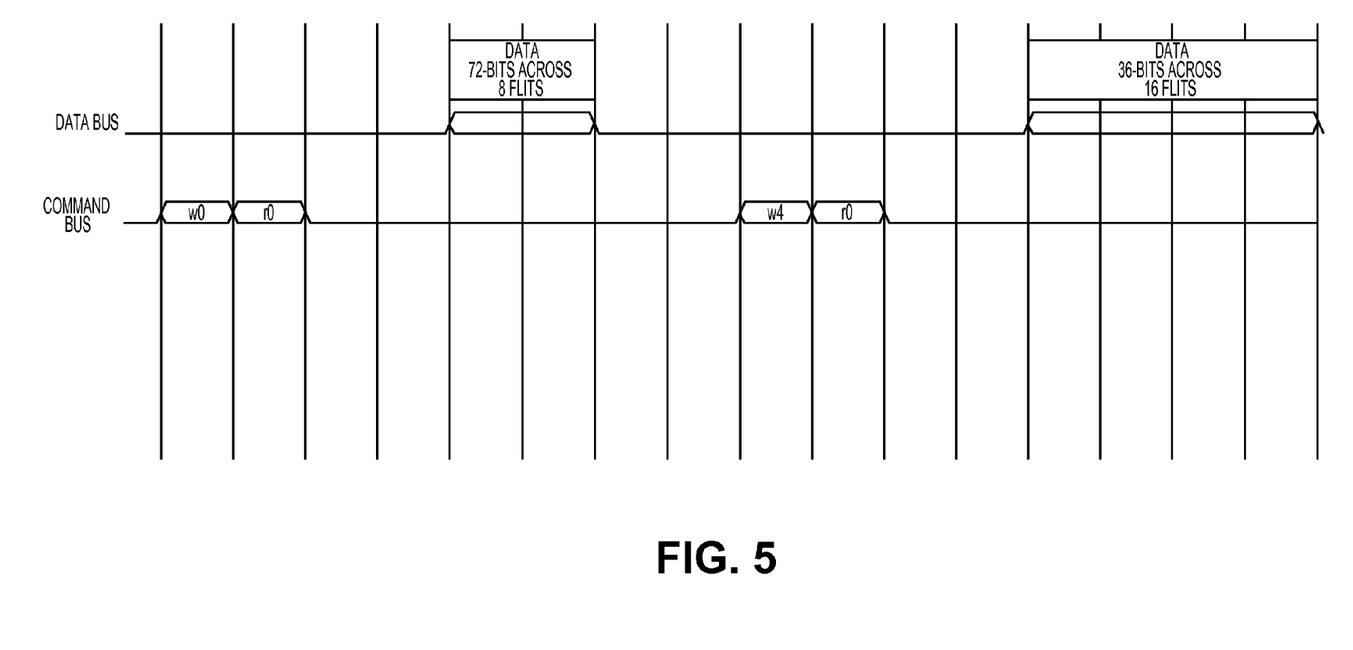
FIG. 5 is a timing diagram of one embodiment of a full-width bus operation.

Once initialization is complete, the link moves to active (L0) state, 420, whereby normal traffic is sent as shown in the base case FIG. 5 below. Active state 420 corresponds to full-width operation for the link. In this example embodiment, the command bus may send one or more commands to the memory device that tell the memory device to perform read or write operations. In this example embodiment as show in FIG. 6, the command bus operated in four FLIT chunks, whereby the first four FLIT chunks are allocated to a write command slot and followed by another four FLIT chunks that are allocated to a read command slot. In this example embodiment, the relative position of the write and read command slots are fixed. In other embodiments, the relative positions may be modifiable.

From active state 420, the link can move into and out of idle state (L1) 430. Idle state 430 corresponds to a state in which the link is idle and data is not being transmitted. From active state 420, the link can also move into and out of sleep state (L2) 450, which corresponds to a state in which the link is powered down and completely inactive.

The communications link can move into and out of partial (e.g., half) width state 440, also referred to as L0p. When in partial width state 440, the link operates in a modulated condition providing a partial width for read/write operations. In a half-width example, half as much data is transmitted over twice as many bus operations. In one embodiment, the link is an OPIO link that is configured as a clustered interface. One or more clusters may be turned off in the transition from active state 420 to partial width state 440. Similarly, one or more clusters may be turned on in the transition from partial width state 440 to active state 420.

Figure 6:
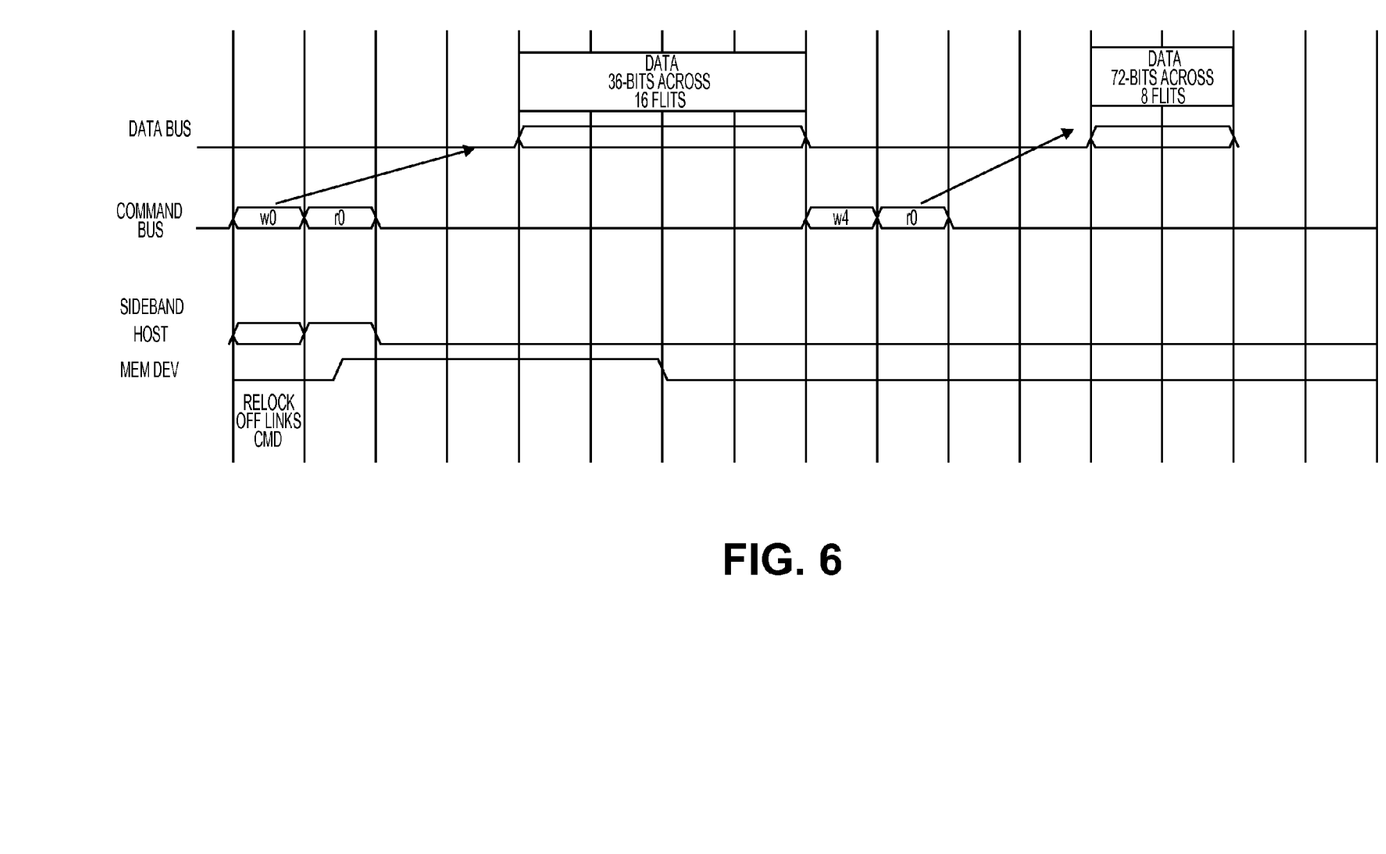
FIG. 6 is a timing diagram of one embodiment of a full-width bus operation.

In one embodiment, L0p is power mode access to an I/O link after it reaches the Active State (L0). If the system agent determines that it Write or Read bus utilization falls below a programmable threshold, it may decide to move the OPIO bus from full width to partial width mode. In this example embodiment, there is no requirement to make it symmetrical such that the write bus and read bus are switched simultaneously to the half width, but rather the host side can decide which bus to move to partial width mode. This example shows the case where an entry to half width active for the write channel happens, which is illustrated in FIG. 6.

In this example embodiment, the host system has issued a write command (labeled w0) then 8 cycles later it sends the data on the write bus. It should be noted, that the write command to write data delay has been selected to illustrate the concept and in a real system it could be sooner or longer than shown. In this example embodiment, the normal operation bus width is 72-bit wide and data is sent for eight FLITs; however other embodiments with other bus widths can also be supported.

In this example embodiment, the system agent had determined that the average write bus utilization was lower than the programmed threshold. So during the read command slot it can transmit a command that tells the memory device to prepare for partial width mode. In this example embodiment, the half width configuration is an encoded field as part of the overall half width command place on the command bus.

In one embodiment, the system design may include specific a half width command entry to half wide write command delay as shown by the delay between read command (r0) slot and the write command (w4) slot. Given the deterministic nature of the memory system, this delay can be specific as part of a data sheet or be training during system initialization.

In this example embodiment, the half width write command (w4) is sent and the host sends write data over 36-bit width and data is sent for 16 FLITs. So the bit density is the same between full width and half width, the host sends half the data for twice as long. In this example embodiment, the unused data lanes will be shut down after the half width write command is received.

For L0p exit, the system agent monitors, for example, write queue size or the average write bus utilization has been higher than a programmable threshold and can determine when to move back to full width mode. During a later partial width write command (show as w40), a sideband communication channel can be used to tell the memory device to power up and retrain the I/O lanes that are inactive. Power on and any training happens in the background during which time the partial width lanes continue to transmit or receive data thereby creating a non-blocking power management state. This is different than traditional power management state like L1 or L2 in other bus technology like PCIe or DDR where turn off all lanes.

In this example embodiment, a sideband communication channel is used whereby a relock I/O lanes command is send serially and a simple request-acknowledge handshake is used to tell the host processing core when the powered off I/O lanes are active and trained. At that time, the host can send a full width write command (shown as ww44), which will tell the memory device when the full width data will be coming.

Again in this example embodiment, the write command to write data is shown to be eight cycles for illustrative purposes and can be shorter or longer depending on the time it take memory device to switch it write data path from partial width back to full width. These examples have detailed a write channel example, but similar mechanism can be employed for partial width read channel and partial width write-read cases.

Figure 7:
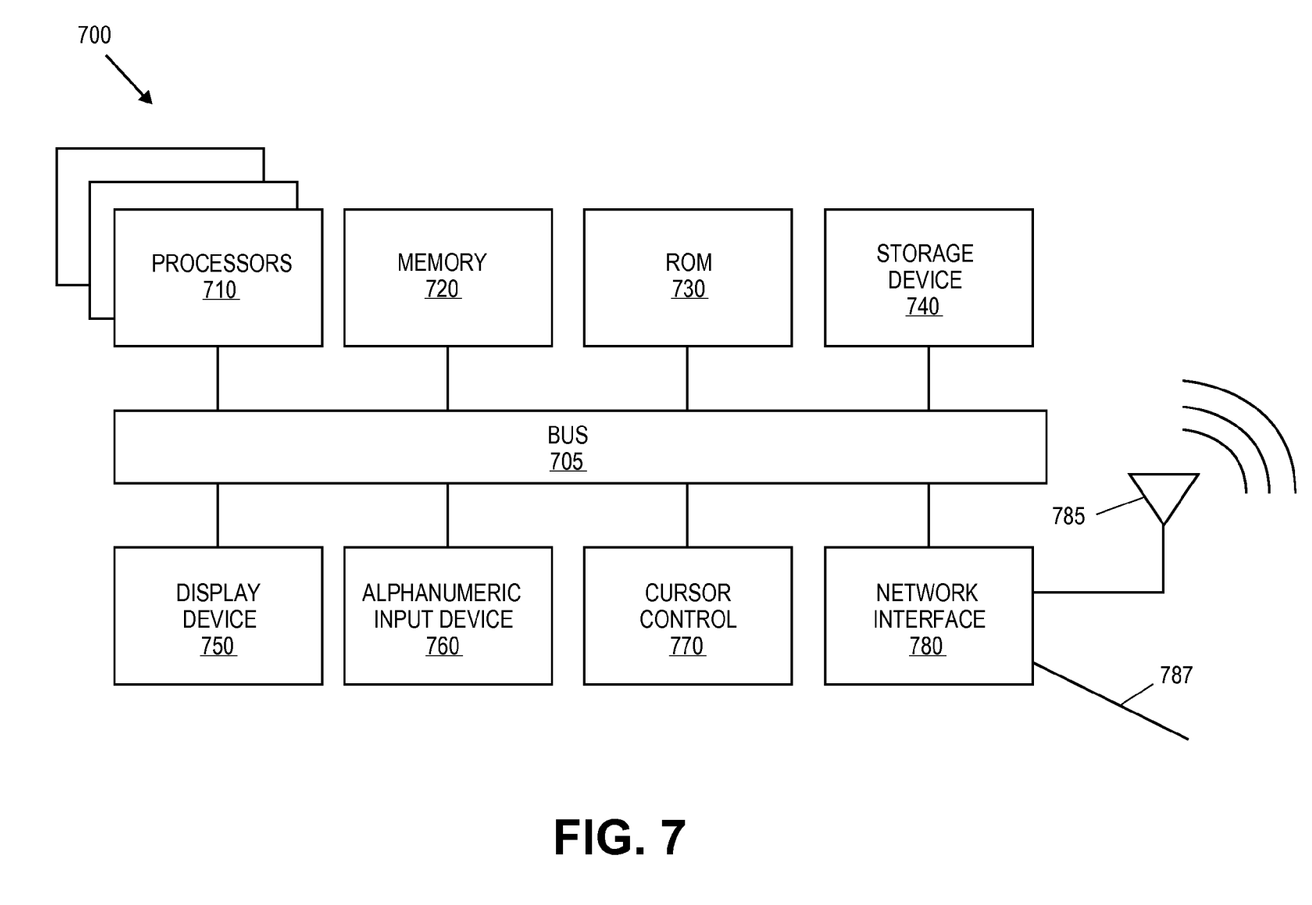
FIG. 7 is a block diagram of one embodiment of an electronic system.

FIG. 7 is a block diagram of one embodiment of an electronic system. The electronic system illustrated in FIG. 7 is intended to represent a range of electronic systems (either wired or wireless) including, for example, a tablet device, a smartphone, a desktop computer system, a laptop computer system, a server etc. Alternative electronic systems may include more, fewer and/or different components.

One or more of the components illustrated in FIG. 7 may be interconnected utilizing the OPIO architectures described herein. For example, multiple processor chips may be interconnected, or a processor and a cache memory or dynamic random access memory, etc.

Electronic system 700 includes bus 705 or other communication device to communicate information, and processor(s) 710 coupled to bus 705 that may process information. Electronic system 700 may include multiple processors and/or co-processors. Electronic system 700 further may include random access memory (RAM) or other dynamic storage device 720 (referred to as memory), coupled to bus 705 and may store information and instructions that may be executed by processor 710. Memory 720 may also be used to store temporary variables or other intermediate information during execution of instructions by processor(s) 710.

Electronic system 700 may also include read only memory (ROM) and/or other static storage device 730 coupled to bus 705 that may store static information and instructions for processor 710. Data storage device 740 may be coupled to bus 705 to store information and instructions. Data storage device 740 such as a magnetic disk or optical disc and corresponding drive may be coupled to electronic system 700.

Electronic system 700 may also be coupled via bus 705 to display device 750, which can be any type of display device, to display information to a user, for example, a touch screen. Input device 760 may be any type of interface and/or device to allow a user to provide input to electronic system 700. Input device may include hard buttons and/or soft buttons, voice or speaker input, to communicate information and command selections to processor(s) 710.

Electronic system 700 may further include sensors 770 that may be used to support functionality provided by Electronic system 700. Sensors 770 may include, for example, a gyroscope, a proximity sensor, a light sensor, etc. Any number of sensors and sensor types may be supported.

Electronic system 700 further may include network interface(s) 780 to provide access to a network, such as a local area network. Network interface(s) 780 may include, for example, a wireless network interface having antenna 785, which may represent one or more antenna(e). Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b and/or IEEE 802.11g and/or IEEE 802.11n standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In one embodiment, a non-blocking, on-package power gating architecture includes a first set of single-ended transmitter circuits on a first die. The full first set of single-ended transmitter circuits is utilized to transmit data during a first operational state and a subset of the first set of single-ended transmitter circuits is utilized to transmit data during a second operational state. A first set of single-ended receiver circuits resides on a second die. Conductive lines between the first set of transmitter circuits and the first set of receiver circuits couple the transmitter circuits to the receiver circuits. The lengths of the plurality of conductive lines are matched.

In one embodiment, the first set of single-ended transmitter circuits are impedance matched and have no equalization and the first set of single-ended receiver circuits have no termination and no equalization. In one embodiment, the a non-blocking, on-package power gating architecture further includes a second set of single-ended receiver circuits on the first die. The receiver circuits have no termination and no equalization. A second set of single-ended transmitter circuits resides on the second die. The transmitter circuits are impedance matched and have no equalization. Conductive lines between the second set of transmitter circuits and the second set of receiver circuits coupled the transmitter circuits and the receiver circuit. The lengths of the plurality of conductive lines are matched.

In one embodiment, the first die comprises at least a processor core and a touch screen interface coupled with the processor core. In one embodiment, the first die, the second die and the plurality of conductive lines are all disposed within a single integrated circuit package.

In one embodiment, tablet computing device includes a touch screen interface. The tablet computing device includes a non-blocking, on-package power gating architecture includes a first set of single-ended transmitter circuits on a first die. The full first set of single-ended transmitter circuits is utilized to transmit data during a first operational state and a subset of the first set of single-ended transmitter circuits is utilized to transmit data during a second operational state. A first set of single-ended receiver circuits resides on a second die. Conductive lines between the first set of transmitter circuits and the first set of receiver circuits couple the transmitter circuits to the receiver circuits. The lengths of the plurality of conductive lines are matched.

In one embodiment, the first set of single-ended transmitter circuits are impedance matched and have no equalization and the first set of single-ended receiver circuits have no termination and no equalization. In one embodiment, the a non-blocking, on-package power gating architecture further includes a second set of single-ended receiver circuits on the first die. The receiver circuits have no termination and no equalization. A second set of single-ended transmitter circuits resides on the second die. The transmitter circuits are impedance matched and have no equalization. Conductive lines between the second set of transmitter circuits and the second set of receiver circuits coupled the transmitter circuits and the receiver circuit. The lengths of the plurality of conductive lines are matched.

In one embodiment, the first die comprises at least a processor core and a touch screen interface coupled with the processor core. In one embodiment, the tablet device also includes an antenna for communication. In one embodiment, the first die, the second die and the plurality of conductive lines are all disposed within a single integrated circuit package.

In one embodiment, wireless system includes an antenna for wireless communications. The wireless system includes a non-blocking, on-package power gating architecture includes a first set of single-ended transmitter circuits on a first die. The full first set of single-ended transmitter circuits is utilized to transmit data during a first operational state and a subset of the first set of single-ended transmitter circuits is utilized to transmit data during a second operational state. A first set of single-ended receiver circuits resides on a second die. Conductive lines between the first set of transmitter circuits and the first set of receiver circuits couple the transmitter circuits to the receiver circuits. The lengths of the plurality of conductive lines are matched.

In one embodiment, the first set of single-ended transmitter circuits are impedance matched and have no equalization and the first set of single-ended receiver circuits have no termination and no equalization. In one embodiment, the a non-blocking, on-package power gating architecture further includes a second set of single-ended receiver circuits on the first die. The receiver circuits have no termination and no equalization. A second set of single-ended transmitter circuits resides on the second die. The transmitter circuits are impedance matched and have no equalization. Conductive lines between the second set of transmitter circuits and the second set of receiver circuits coupled the transmitter circuits and the receiver circuit. The lengths of the plurality of conductive lines are matched.

In one embodiment, the first die comprises at least a processor core and a touch screen interface coupled with the processor core. In one embodiment, the tablet device also includes a touchscreen interface. In one embodiment, the first die, the second die and the plurality of conductive lines are all disposed within a single integrated circuit package.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus, comprising:
a first set of single-ended transmitter circuits on a first die, wherein the first set of single-ended transmitter circuits is to transmit data during a first operational state and a subset of the first set of single-ended transmitter circuits is to transmit data during a second operational state;
a first set of single-ended receiver circuits on a second die;
a first plurality of conductive lines between the first set of transmitter circuits and the
first set of receiver circuits, wherein the lengths of the plurality of conductive lines are matched;
a second set of single-ended receiver circuits on the first die;
a second set of single-ended transmitter circuits on the second die, wherein the second set of single-ended transmitter circuits is to transmit data during a third operational state and a subset of the second set of single-ended transmitter circuits is to transmit data during a fourth operational state; and
wherein the first and fourth operational states are able to concurrently exist and/or the second and third operational states are able to concurrently exist and wherein one of the first and second die is a memory and the other of the first and second die is to read from and write to the memory and where the concurrent existence of the first and fourth operational states and/or the second and third operational states correspond to a write width that is different than a read width.

2. The apparatus of claim 1 wherein the subset of the first set of single-ended transmitter circuits comprises half of the first set of single-ended transmitter circuits.

3. The apparatus of claim 1 wherein the subset of the first set of single-ended transmitter circuits comprises one quarter of the first set of single-ended transmitter circuits.

4. The apparatus of claim 1, wherein the first set of single-ended transmitter circuits are impedance matched and have no equalization and, wherein the first set of single-ended receiver circuits have no termination and no equalization.

5. The apparatus of claim 1, wherein the first die comprises at least a processor core, the apparatus further comprising a touch screen interface coupled with the processor core.

6. A tablet computing device, comprising:
a touch screen interface;
a first set of single-ended transmitter circuits on a first die, wherein the first set of single-ended transmitter circuits is to transmit data during a first operational state and a subset of the first set of single-ended transmitter circuits is to transmit data during a second operational state;
a first set of single-ended receiver circuits on a second die;
a first plurality of conductive lines between the first set of transmitter circuits and the
first set of receiver circuits, wherein the lengths of the plurality of conductive lines are matched;
a second set of single-ended receiver circuits on the first die;
a second set of single-ended transmitter circuits on the second die, wherein the second set of single-ended transmitter circuits is to transmit data during a third operational state and a subset of the second set of single-ended transmitter circuits is to transmit data during a fourth operational state; and
wherein the first and fourth operational states are able to concurrently exist and/or the second and third operational states are able to concurrently exist and wherein one of the first and second die is a memory and the other of the first and second die is to read from and write to the memory and where the concurrent existence of the first and fourth operational states and/or the second and third operational states correspond to a write width that is different than a read width.

7. The tablet of claim 6 wherein the subset of the first set of single-ended transmitter circuits comprises half of the first set of single-ended transmitter circuits.

8. The tablet of claim 6 wherein the subset of the first set of single-ended transmitter circuits comprises one quarter of the first set of single-ended transmitter circuits.

9. The tablet of claim 6, wherein the first set of single-ended transmitter circuits are impedance matched and have no equalization and, wherein the first set of single-ended receiver circuits have no termination and no equalization.

10. The tablet of claim 6 further comprising an antenna for communication.

11. The tablet of claim 6 wherein the first die, the second die and the plurality of conductive lines are all disposed within a single integrated circuit package.

12. A system comprising:
an omnidirectional antenna;
a first set of single-ended transmitter circuits on a first die, wherein the first set of single-ended transmitter circuits is to transmit data during a first operational state and a subset of the first set of single-ended transmitter circuits is to transmit data during a second operational state;
a first set of single-ended receiver circuits on a second die; and
a first plurality of conductive lines between the first set of transmitter circuits and the
first set of receiver circuits, wherein the lengths of the plurality of conductive lines are matched;
a second set of single-ended receiver circuits on the first die;
a second set of single-ended transmitter circuits on the second die, wherein the second set of single-ended transmitter circuits is to transmit data during a third operational state and a subset of the second set of single-ended transmitter circuits is to transmit data during a fourth operational state; and,
wherein the first and fourth operational states are able to concurrently exist and/or the second and third operational states are able to concurrently exist and wherein one of the first and second die is a memory and the other of the first and second die is to read from and write to the memory and where the concurrent existence of the first and fourth operational states and/or the second and third operational states correspond to a write width that is different than a read width.

13. The system of claim 12 wherein the subset of the first set of single-ended transmitter circuits comprises half of the first set of single-ended transmitter circuits.

14. The system of claim 12 wherein the subset of the first set of single-ended transmitter circuits comprises one quarter of the first set of single-ended transmitter circuits.

15. The system of claim 12, wherein the first set of single-ended transmitter circuits are impedance matched and have no equalization and, wherein the first set of single-ended receiver circuits have no termination and no equalization.

16. The system of claim 12, wherein the first die comprises at least a processor core, the apparatus further comprising a touch screen interface coupled with the processor core.

17. The system of claim 12 wherein the first die, the second die and the plurality of conductive lines are all disposed within a single integrated circuit package.

18. An apparatus, comprising:
a first semiconductor die, comprising:
a first set of single-ended transmitter circuits, wherein the first set of single-ended transmitter circuits is to transmit data to a second die during a first operational state and a subset of the first set of single-ended transmitter circuits is to transmit data to the second die during a second operational state;
a first set of single-ended receiver circuits to receive data from a second die, wherein the first set of single-ended receiver circuits is to receive data from the second die during a third operational state and a subset of the second set of single-ended transmitter circuits is to receive data from the second die during a fourth operational state, wherein the first and fourth operational states are able to concurrently exist and/or the second and third operational states are able to concurrently exist;
wherein one of the first and second die is a memory and the other of the first and second die is to read from and write to the memory and where the concurrent existence of the first and fourth operational states and/or the second and third operational states correspond to a write width that is different than a read width.

19. The apparatus of claim 18 further comprising the second die.

20. The apparatus of claim 19 wherein the first die and the second die are within a same semiconductor package.

* * * * *